Feb. 11, 1941.  A. J. MASON, JR  2,231,767
OPEN-HOLE SUPPORT
Filed Dec. 18, 1939   3 Sheets-Sheet 1
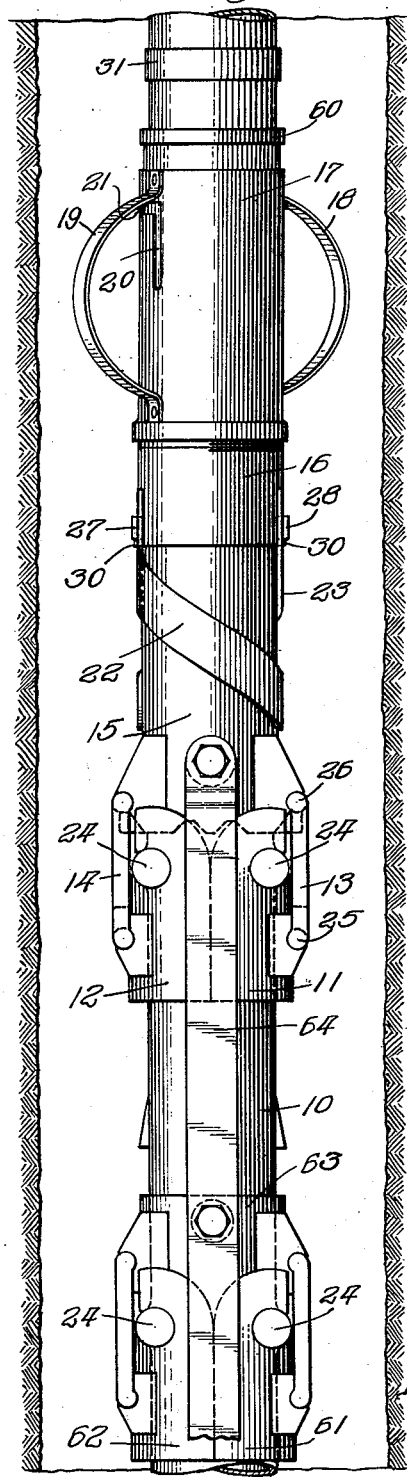
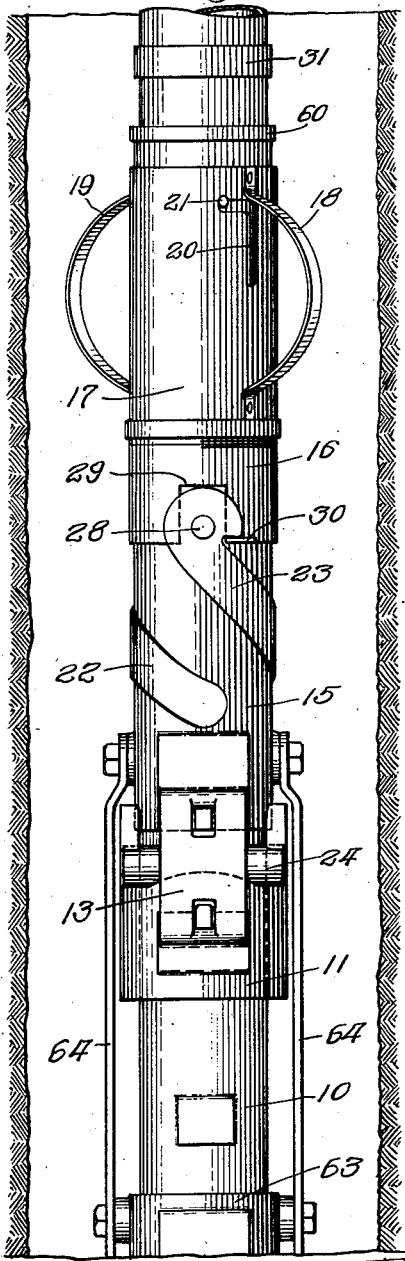
Inventor:
Arthur J. Mason Jr.

Feb. 11, 1941. A. J. MASON, JR 2,231,767
OPEN-HOLE SUPPORT
Filed Dec. 18, 1939 3 Sheets-Sheet 2

Feb. 11, 1941.  A. J. MASON, JR  2,231,767
OPEN-HOLE SUPPORT
Filed Dec. 18, 1939   3 Sheets-Sheet 3
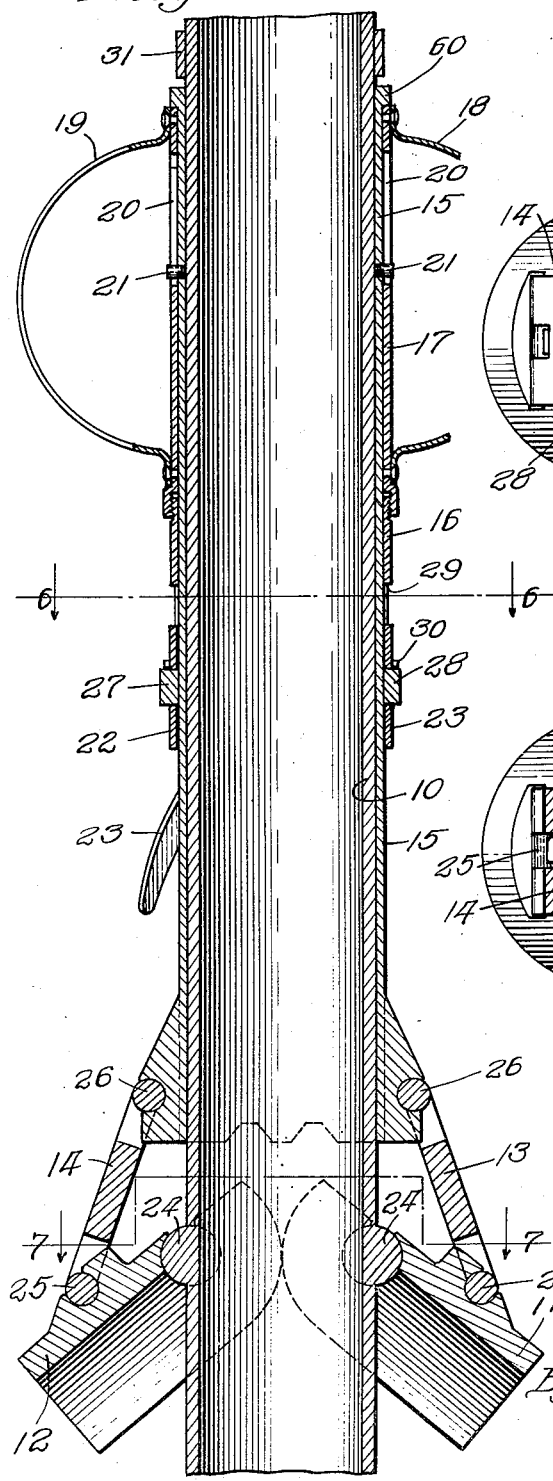
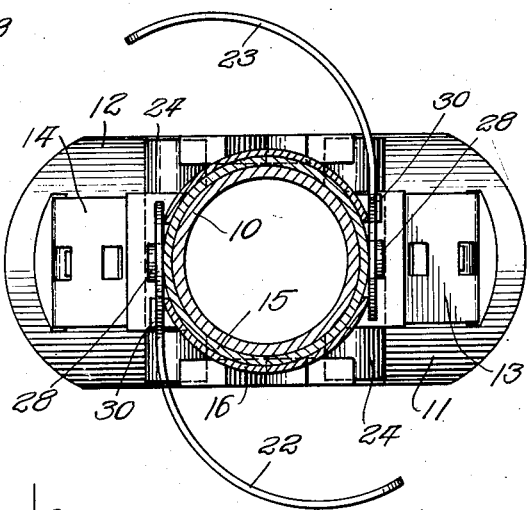
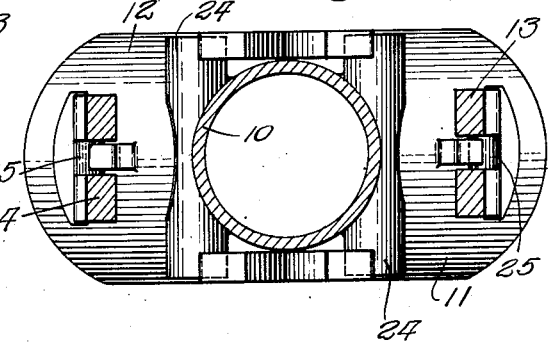
Inventor:
Arthur J. Mason Jr.

Patented Feb. 11, 1941

2,231,767

UNITED STATES PATENT OFFICE 2,231,767

OPEN-HOLE SUPPORT

Arthur J. Mason, Jr., Bakersfield, Calif.

Application December 18, 1939, Serial No. 309,857

14 Claims. (Cl. 166—10)

This invention relates to an open-hole support, and more particularly to improved means for supporting a packer or other element at a desired depth in an open oil-well hole.

Figure 3:
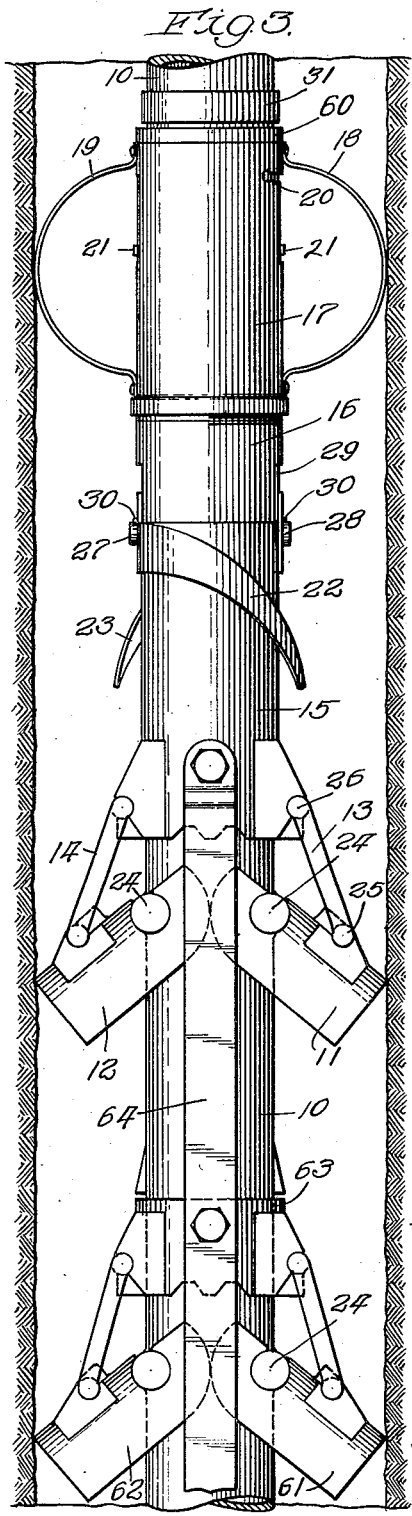
Figure 4:
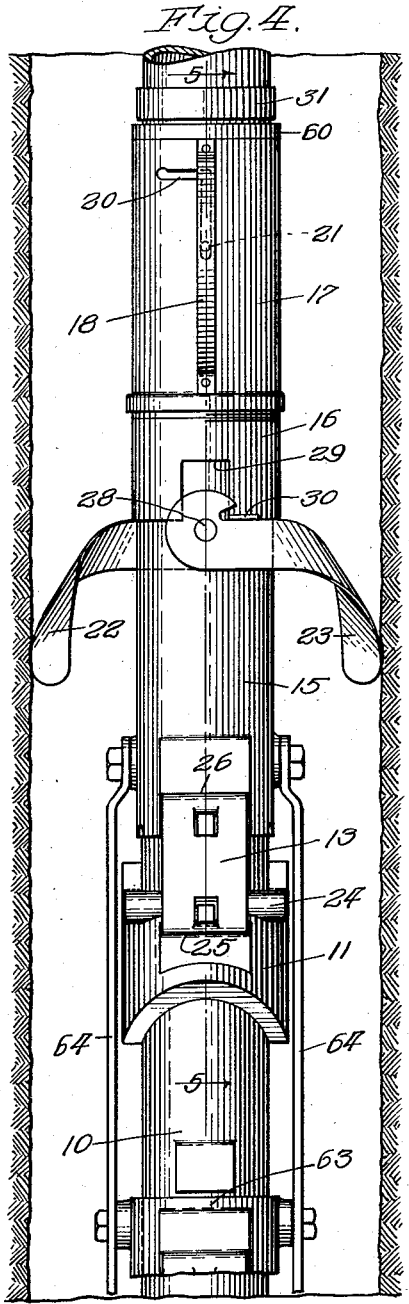

One feature of this invention is that it provides improved means for supporting an element in a drill hole; another feature of this invention is that it is particularly adapted for use in an uncased drill hole; yet another feature of this invention is that support is achieved by pivotal elements operating on the toggle principle, positively swung into action by link means, rather than by the more conventional wedging operation; a further feature of this invention is the ratchet arms, in addition to the usual spring friction guide for assisting in setting the apparatus; still another feature of this invention is that apparatus embodying it can be built up entirely on the outside of the pipe, so it achieves the desired results without projecting into or restricting the opening through the pipe or tubing on which it works; another feature is that my supporting and operating mechanism is collapsible for ease in withdrawing from the hole, but is particularly sturdy and positive in operation; other features and advantages of this invention will be apparent from the following specification and the drawings, in which:

Figure 1 is a side elevation of apparatus embodying my invention, the apparatus lying within a drill hole in a closed or non-supporting posture; Figure 2 is an elevational view of the apparatus shown in Figure 1, at right angles to such view; Figure 3 is a view from the same side as Figure 1, but with the parts in wall-engaging position; Figure 4 is a view of the apparatus as shown in Figure 3, but at right angles thereto; Figure 5 is a vertical sectional view along the line 5—5 of Figure 4; Figure 6 is a transverse view, particularly in section, along the line 6—6 of Figure 5; and Figure 7 is a transverse view, principally in section, along the line 7—7 of Figure 5.

In drilling deep holes in the earth, as in drilling oil wells, it is frequently desirable to locate an element at some certain depth in the hole and fix it at that point while making a test. This is particularly desirable in connection with packers, used to seal off the hole at some point in order that a sample of fluid flowing into the hole below that point may be taken, or in order that some other operation may be performed. Or in a wildcat well, it may be desirable to support a short length of casing while it is being cemented in place.

Various apparatus and methods have been devised for supporting packers or other elements at a desired position in a "cased" hole by engagement of some parts with steel casing, but these have not proved practicable in uncased or open holes. The supporting mechanism for most packers now in use comprises friction grip elements adapted to be crowded out into engagement with the wall of the hole by movement of a sliding wedge between them and the pipe on which they are mounted. Such devices are quite satisfactory in a cased hole where the internal diameter is definite and accurate, and will not change appreciably under the strain of engagement by the wedge-driven parts. However, such supporting means is of little use in uncased holes, since only a thin wedge can be used in the confined space, and the rock wall crushes or tends to cut away upon engagement of the gripping parts, and consequently cannot support the packer or other element in the desired position. It therefore has been the custom in the drilling art to cut a shoulder in an open hole at a point above where it is desired to take a sample.

It is highly undesirable and expensive in some instances, however, to have to drill ahead a small diameter hole, called a "rat hole," in order to provide shoulders on which packers or "formation testers" can be supported. My supporting apparatus disclosed and claimed herewith is simple and positive in action, has a wide range of movement with respect to the element, and provides positive support for a packer or other element at any desired depth in an uncased hole of uniform bore, eliminating the necessity for a shoulder.

Referring more particularly to the embodiment of my invention disclosed herewith, a pipe or tubing 10 has pivotally mounted thereon a plurality of duplicate pairs of supporting legs. The upper pair of legs 11 and 12, which will be described in detail, are pivotally connected by links 13 and 14 to a collar member 15 longitudinally movable with respect to the pipe. A clutch collar 16 threaded to a conventional guide collar 17 encircles the collar 15. The guide collar carries, in conventional manner, outwardly extending pieces of spring metal, as 18 and 19, adapted to continually engage the wall of the hole to cause frictional resistance to movement of the collar, so that rotational or longitudinal movement between the collar and the packer can be effected from the surface. The guide collar, a common oil well device, enables any contrivance to remain locked in a desired relation during lowering into a hole, as by engagement of the pin 21 with the edges of the horizontal portion of the slot 20, and to be unlocked thereafter by rotation at the surface of one part with respect to the other. When collars 16 and 17 slide on the pipe, a pair of ratchet arms 22 and 23 of spring metal are opened and engage the wall of the hole. The ratchet arms act to assist the conventional guide collar's relative movement, aiding the guide collar in its function of operating the legs and setting the device in position.

The legs, links, ratchets and side bars are all arranged in pairs, on opposite sides of the packer. The use of double or duplicate parts symmetrically spaced about the pipe ensures the centering of the device in the hole at all times, and the proper operation of the parts. Inasmuch as the majority of the parts duplicate each other, only one such part will be described in detail in each case; and it will be understood that the other part is a duplicate and similarly arranged.

Referring first to the legs, it will be seen that the leg 11 is substantially a segment of a cylinder of fairly heavy metal, so that a cross section through the leg is arcuate, the leg being so mounted that the concave side thereof fits around the pipe. The leg is pivotally mounted on the pipe or other element by engagement with a substantially cylindrical axle or trunnion member 24 here shown as cast integrally with the pipe 10. Inasmuch as the cross section of the leg is arcuate and the bearing surface with which it cooperates is cylindrical, the actual bearing between the leg and the axle 24 is in different planes at different parts thereof, as may be best seen in Figures 2 and 4. This provides a particularly strong and sturdy connection. Gear segments, not shown, can be provided on the adjacent edges of the legs to ensure simultaneous movement of both legs at all times.

The link 13 is a plate of fairly heavy metal, preferably a half inch or more in thickness, with a pair of axles or trunnion members 25 and 26 welded or cast at each end or integrally formed therewith. As may be well seen in Figure 5, it links together the leg and the collar member 15.

The link with its trunnions 25 and 26 may be slipped sidewise into its respective bearings, like a link of a common chain belt is attached, so long as the plate is in line with the opening; and then when the leg is brought into its engagement with the axle 24 the angle of the intermediate link is such that it is no longer possible for the link to slip out of its bearings.

When the parts are in inactive or closed position, as shown in Figures 1 and 2, a very compact arrangement is provided which occupies the minimum of the annular space around the central tube, between it and the wall of the bore. The only parts which project any great distance are the conventional spring cage or guide arms 18 and 19. On the other hand, when the parts swing out into wall-engaging position they are able to grip the walls of even a relatively large drill hole, as may be readily seen in Figures 3 and 4. The distance which the outer ends of the legs can extend from the packer body is a function only of the length of the legs, and can be made any desired distance consonant with the strength necessary to support a heavy weight.

As may be best seen in Figures 4 and 5, the spiral ratchet arms 22 and 23 are pivotally mounted on studs 27 and 28 on the inner collar 15, these studs lying inside slots, as 29 in the clutch collar 16. An outwardly turned edge on each side of the clutch collar, as 30, fits in a niche in the hub of each ratchet to insure the ratchet's being swung upwardly and outwardly as the clutch and guide collars slide with respect to the long collar 15. They also act as a stop, when the collar 17 strikes the annular shoulder 60 on the top of the collar 15, to limit the ratchet's swing. When these ratchets engage the wall of the drill hole they press out strongly and assist the guide bars 18 and 19 in holding stationary the principal operating collar 15. Upward movement of this latter collar (or downward movement of tubing 10, depending on how you wish to look at it) rotates the legs 11 and 12 upwardly and outwardly to cause them to bite into the wall of the hole and, by their toggle action, secure a firm footing to support the weight of some or all of the string of tubing above it. When the legs have swung out to a position less than perpendicular to the axis of the tubing, the long inner sleeve 15, at its top, comes into abutting engagement with the shoulder or stop member 31. This limits further upward movement of the collar 15; and the links 13 and 14 thereupon act as braces, disposed at a highly effective angle, to stop the legs from opening too wide. This arrangement not only insures the maximum strength and weight-carrying ability, but also insures an easy return of the parts to closed position when it is desired to remove or raise the packer.

In order to provide the maximum supporting effect additional pairs of legs, as heretofore mentioned, may be used. One such additional pair, here shown as the legs 61 and 62, are linked to the slidable collar 63. This collar is connected to the collar 15 by a pair of similar links, here indicated by the reference numeral 64, adapted to operate these and still further pairs of legs. Movement between the tubing and the collar 15 thus effects similar movement between the tubing and this collar 63, so that movement of the legs 61 and 62 is coincident with that of the legs 11 and 12.

To summarize the action, when the pipe 10 has reached a point in the drill hole at which it is desired to support it, the pipe is first rotated to unlock the guide collar, in the conventional manner, then lowered a few inches. The lowering swings out the ratchets, and then the supporting legs, since first the guide and clutch collars, and then all three collars, tend to remain stationary in the hole while the pipe 10 slides through them until it can go no further, thenceforth being supported in position by the legs.

While I have shown and described certain embodiments of my invention, it is to be understood that it is capable of many modifications. Changes, therefore, in the construction and arrangement may be made without departing from the spirit and scope of the invention as disclosed in the appended claims.

I claim:

1. Apparatus for supporting an element in a desired position in an uncased drill hole, including: a leg pivotally mounted on the element; and link means for swinging the leg into a position where its outer end engages the wall of the hole to support the element therein, the outer end of the leg presenting a substantial area engaging the bore wall and holding the element against downward movement.

2. Apparatus for supporting an element in a desired position in an uncased drill hole, including: a leg pivotally mounted at one end on the element; and link means for swinging the other end of the leg into engagement with the wall of the hole to support the element therein, the wall engaging end of the leg presenting a substantial area holding the element against downward movement and the link acting as a brace for the leg at the end of its movement.

3. Apparatus for supporting an element in a desired depth in an uncased drill hole, including: a leg pivotally mounted on the element; a link having one end pivotally connected to the leg intermediate its ends; and a member longitudinally movable on the element, having the other end of the link pivotally connected thereto, whereby movement of the member with respect to the element moves the leg from one to another of two positions, the leg being closely adjacent the element in one position and at a substantial angle thereto in the other, with its outer end engaging the wall of the hole, the wall engaging end of the leg presenting a substantial area holding the element against downward movement.

4. Apparatus of the character claimed in claim 3, wherein there are a plurality of legs and links symmetrically spaced about the element.

5. Apparatus of the character claimed in claim 3, wherein there are a plurality of pairs of legs and links longitudinally spaced along the element.

6. Apparatus of the character claimed in claim 3, wherein the movement between the member and element is limited, so that the link provides a brace for the leg in its wall-engaging position at one limit of its movement.

7. Apparatus for supporting an element in a desired depth in a drill hole, including: a leg pivotally mounted on the pipe; a link having one end pivotally connected to the leg intermediate its end; a member longitudinally movable on the pipe, having the other end of the link pivotally connected thereto, whereby movement of the member with respect to the element moves the leg from one to another of two positions, the leg being closely adjacent the pipe in one position and at a substantial angle thereto in the other, with its outer end engaging the wall of the hole; and means operatively associated with the member and adapted to frictionally engage the wall of the hole, whereby movement between the member and the element may be effected.

8. Apparatus for supporting an element in a desired depth in a drill hole, including: a leg pivotally mounted on the pipe; a link having one end pivotally connected to the leg intermediate its ends; a member longitudinally movable on the pipe, having the other end of the link pivotally connected thereto, whereby movement of the member with respect to the element moves the leg from one to another of two positions, the leg being closely adjacent the pipe in one position and at a substantial angle thereto in the other, with its outer end engaging the wall of the hole; and an arm pivotally mounted on the member and adapted to engage the wall of the hole to assist in the effecting of relative movement between the member and the element.

9. Apparatus for supporting an element in a desired position in a drill hole, including: means movably mounted on the element and adapted to engage the wall of the hole to grip it and effect the desired support; a member slidably mounted on the element having means thereon adapted to continuously frictionally engage the wall, said member being operatively connected to the first mentioned means to effect movement thereof; and an arm pivotally mounted to be swung out into engagement with the wall upon initial movement of the member with respect to the element, whereupon further movement of the member to move said means is assisted.

10. Apparatus of the character claimed in claim 9, wherein the arm is of spring metal and has in general the shape of a portion of a helix.

11. Apparatus of the character claimed in claim 9, wherein there are a plurality of the arms symmetrically spaced about the element.

12. Apparatus for supporting an element in a desired position in a drill hole, including: a leg pivotally mounted on the element; and link means for swinging the leg into a position where its outer end engages the wall of the hole to support the element therein, the leg being formed with an arcuate cross section, the concave side thereof being down when the leg is in engagement with the wall.

13. Apparatus for supporting an element in a desired position in a drill hole, including: a leg pivotally mounted on the element; and link means for swinging the leg into a position where its outer end engages the wall of the hole to support the element therein, the leg being formed with an arcuate cross section and being pivotally mounted on a cylindrical bearing surface.

14. Apparatus for supporting a tubing element in a desired position in a drill hole, including: a leg pivotally mounted on the element; and link means for swinging the leg into a position where its outer end engages the well of the hole to support the element therein, the leg being formed with an arcuate cross section substantially conforming to the outer surface of the tubing, and being pivotally mounted on a cylindrical bearing surface in engagement with the leg throughout substantially its entire cross section.

ARTHUR J. MASON, Jr.